(12) United States Patent
Gwon

(10) Patent No.: US 12,039,520 B2
(45) Date of Patent: Jul. 16, 2024

(54) CONTENT WALLET, TERMINAL DEVICE, AND CONTENT SALES SYSTEM INCLUDING THE SAME

(71) Applicant: Oh Gyoung Gwon, Seoul (KR)

(72) Inventor: Oh Gyoung Gwon, Seoul (KR)

( * ) Notice: Subject to any disclaimer, the term of this patent is extended or adjusted under 35 U.S.C. 154(b) by 86 days.

(21) Appl. No.: 17/615,372

(22) PCT Filed: May 25, 2020

(86) PCT No.: PCT/KR2020/006768
§ 371 (c)(1),
(2) Date: Nov. 30, 2021

(87) PCT Pub. No.: WO2020/242166
PCT Pub. Date: Dec. 3, 2020

(65) Prior Publication Data
US 2022/0230163 A1    Jul. 21, 2022

(30) Foreign Application Priority Data

May 30, 2019    (KR) .................. 10-2019-0063590

(51) Int. Cl.
*G06Q 20/36*    (2012.01)
*G06F 21/10*    (2013.01)
(Continued)

(52) U.S. Cl.
CPC ......... *G06Q 20/3674* (2013.01); *G06F 21/10* (2013.01); *G06Q 20/4014* (2013.01); *H04L 63/083* (2013.01); *G06Q 2220/00* (2013.01)

(58) Field of Classification Search
CPC .......... G06Q 20/3674; G06Q 20/4014; G06Q 2220/00; H04L 63/083
USPC ........................................... 705/67
See application file for complete search history.

(56) References Cited

U.S. PATENT DOCUMENTS 10,600,009 B1 *    3/2020   Augustine et al.
2002/0166009 A1 *  11/2002  Lin
(Continued)

FOREIGN PATENT DOCUMENTS

JP    2006-128892 A    5/2006
JP    2014-527659 A    10/2014
(Continued)

OTHER PUBLICATIONS

Cho Eunwon, "Cryptocurrency Meets Social News Platform. Pay Attention to Sapien", Retrieved from URL:http://www.thenchain.co.kr/news/article_View.html?idxuo=67, Feb. 6, 2018, 2pages.
(Continued)

*Primary Examiner* — Neha Patel
*Assistant Examiner* — Yin Y Choi
(74) *Attorney, Agent, or Firm* — The PL Law Group, PLLC

(57) ABSTRACT

A content wallet includes a network module configured to communicate with a terminal device; and a toggle switch configured to control a connection between an external memory inserted into an accommodation groove and the network module, in which content stored in the external memory is transmitted to the terminal device through the network module, when the external memory and the network module are connected according to a manipulation of a user for the toggle switch.

7 Claims, 6 Drawing Sheets

(51) Int. Cl.
    *G06Q 20/40*     (2012.01)
    *H04L 9/40*     (2022.01)

(56) References Cited

U.S. PATENT DOCUMENTS

| | | | |
|---|---|---|---|
| 2005/0283618 A1* | 12/2005 | Min | |
| 2007/0220456 A1* | 9/2007 | Daun et al. | |
| 2008/0077808 A1* | 3/2008 | Teicher et al. | |
| 2010/0011163 A1* | 1/2010 | Mardiks | |
| 2015/0181413 A1* | 6/2015 | Singamsetti et al. | |
| 2016/0049816 A1* | 2/2016 | Yang | |
| 2016/0360282 A1* | 12/2016 | Graham et al. | |

FOREIGN PATENT DOCUMENTS

| | | | |
|---|---|---|---|
| KR | 10-2002-0012559 A | 2/2002 | |
| KR | 10-2004-004703 A | 1/2004 | |
| KR | 10-0669224 B1 | 1/2007 | |

OTHER PUBLICATIONS

Korea Intellectual Property Office Grant of Patent for KR 10-2019-0063590 dated Dec. 1, 2020.
Korea Intellectual Property Office Notification of Reason for Refusal for KR 10-2019-0063590 dated Jun. 29, 2020.
International Search Report for PCT/KR2020/006768 dated Sep. 1, 2020 [PCT/ISA/210].
"The encounter of the minor news platform and encoding lungs" corp. PN 'attention' (Feb. 6, 2018 disclosure).

\* cited by examiner

[FIG. 1]
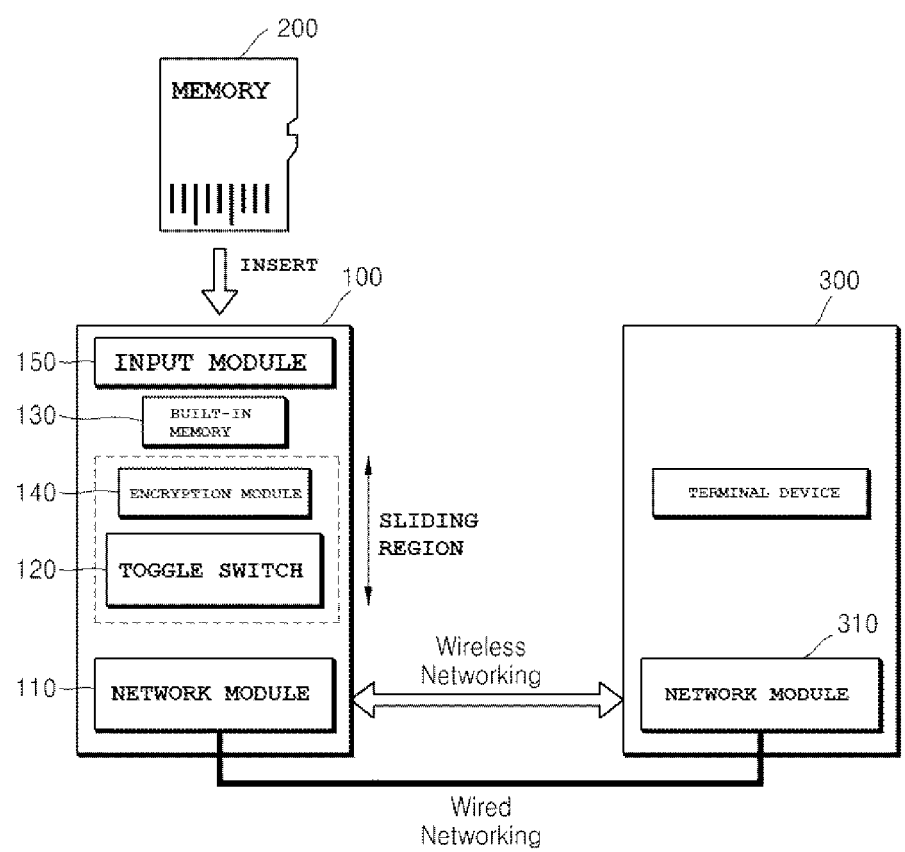

[FIG. 3]
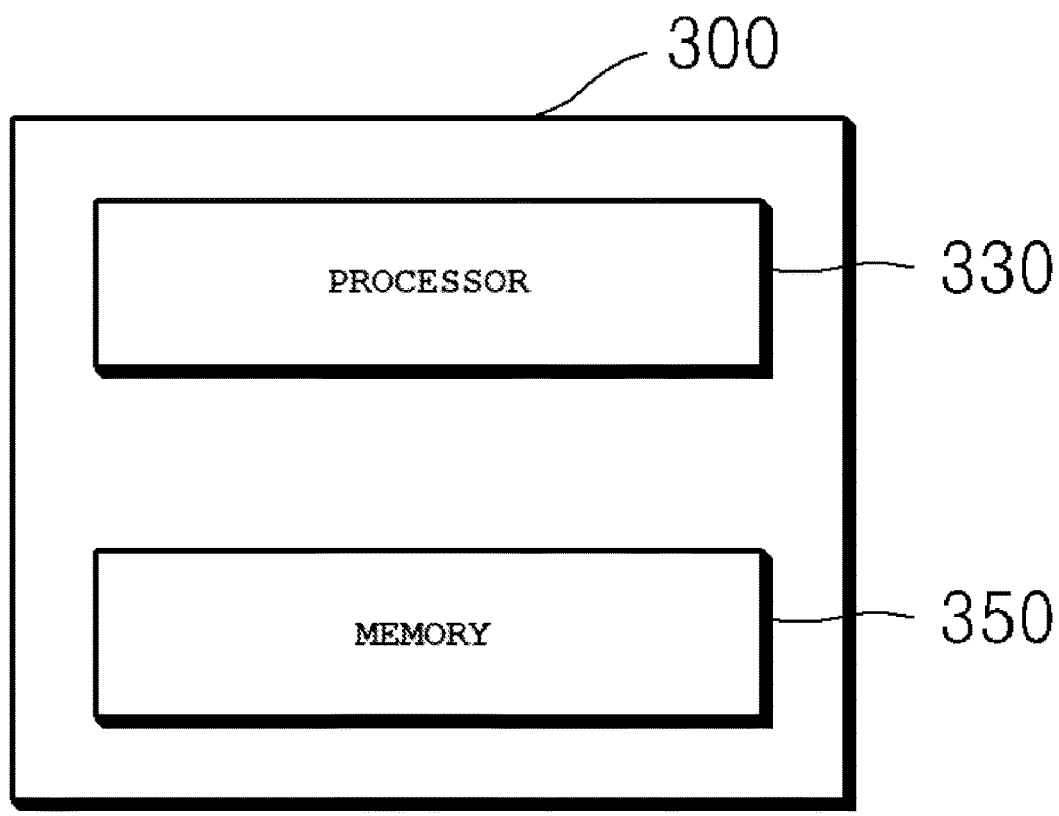

[FIG. 4]
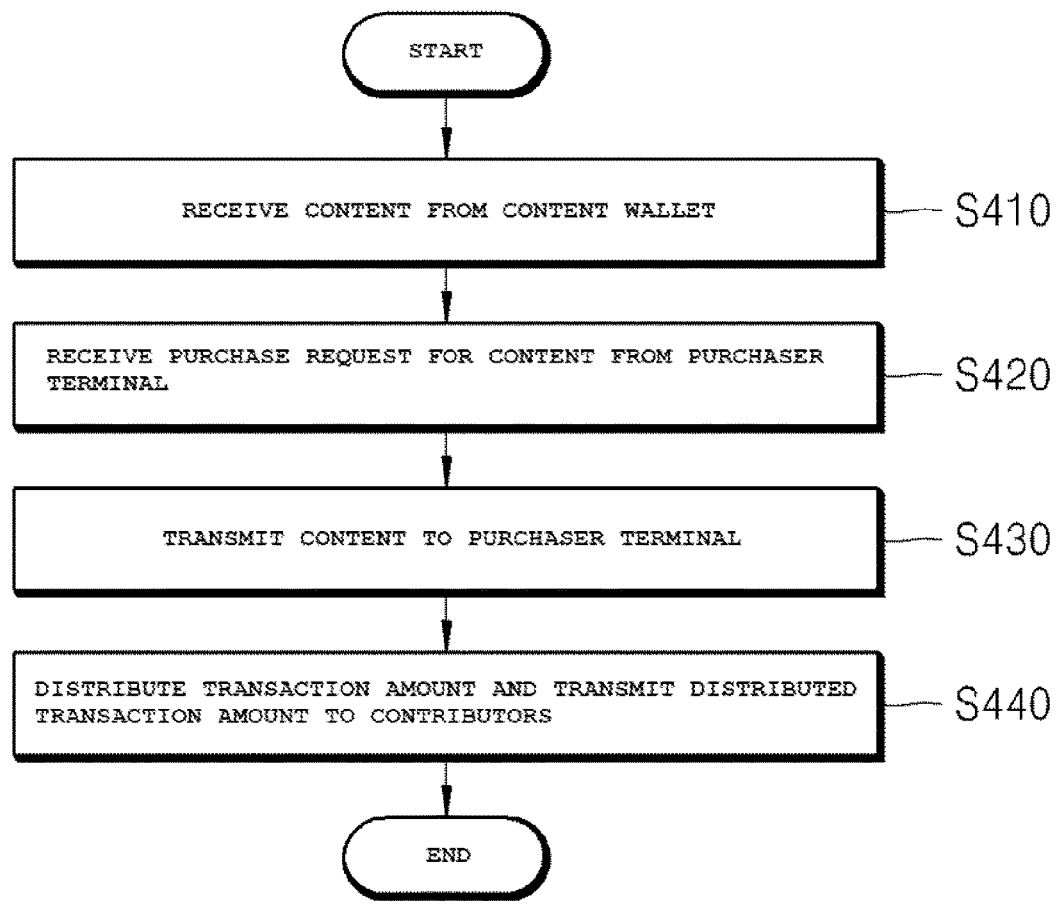

[FIG. 5]
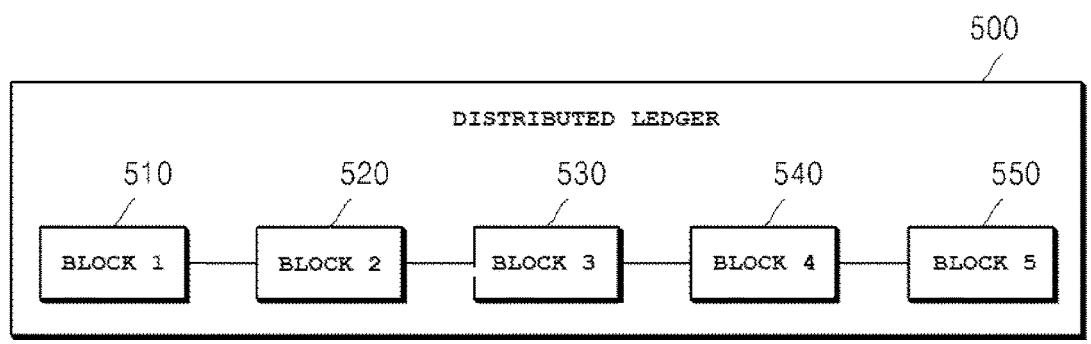

CONTENT WALLET, TERMINAL DEVICE, AND CONTENT SALES SYSTEM INCLUDING THE SAME

CROSS REFERENCE TO RELATED APPLICATIONS

This application is a National Stage of International Application No. PCT/KR2020/006768 filed May 25, 2020, claiming priority based on Korean Patent Application No. 10-2019-0063590 filed May 30, 2019, the entire disclosures of which are incorporated herein by reference.

TECHNICAL FIELD

The disclosure relates to the field of content transaction, and more particularly, to a content wallet for storing content, a terminal device for selling content, and a content sales system including the same.

BACKGROUND ART

In the existing content transaction market, mediators or providers, not creators or producers of content, took the initiative in transacting content and distributing profits. Digital platform providers that sell content has concentrated their efforts on securing market monopoly rights, and accordingly, excessive competition in which content production costs are not considered has developed, and the social perception that content is free has become widespread. In addition, indirect methods in which commercial advertisings are directly or indirectly included in content or service providers collect flat fees to create profits, have become mainstream.

Such a transaction structure is advantageous for those who collect, transform and redistribute content, or those who produce sensational or gossip content. Therefore, there is a problem that talented people do not receive adequate compensation even in a situation in which contents are produced overwhelmingly more than before.

In order to improve such an unfair compensation system, a method is required to allow the original creator of the content to take the initiative and participate in the data transaction.

DISCLOSURE

Technical Problem

The disclosure provides a content wallet, a terminal device, and a content sales system including the same that may provide fair compensation for content transactions to content creators and contributors who have contributed to content production.

Further, an object of the disclosure is to prevent unauthorized distribution of content due to hacking or the like.

Further, an object of the disclosure is to promote an activation of content transactions between individuals.

The technical problems to be achieved by the content wallet, the terminal device, and the content sales system including the same according to the technical idea of the disclosure are not limited to the problems mentioned above, and other problems not mentioned will be clearly understood by those skilled in the art from the following description.

Technical Solution

According to an aspect of the disclosure, a content wallet includes a network module configured to communicate with a terminal device; and a toggle switch configured to control a connection between an external memory inserted into an accommodation groove and the network module, wherein content stored in the external memory may be transmitted to the terminal device through the network module, when the external memory and the network module are connected according to a manipulation of a user for the toggle switch.

When the toggle switch is moved in a first direction according to the manipulation of the user, the external memory and the network module may be connected, and when the toggle switch is moved in a second direction according to the manipulation of the user, the connection between the external memory and the network module may be released.

The content wallet may further include an input module configure to receive a first password from the user, wherein the first password may be transmitted to the terminal device through the network module, and user authentication may be performed according to a comparison result between a second password input to the terminal device and the first password.

The content wallet may further include encryption module configured to encrypt the content stored in the external memory, wherein the content encrypted by the encryption module may be transmitted to the terminal device through the network module.

According to another aspect of the disclosure, a content sales system includes a content wallet configured to include a toggle switch for controlling a connection between an external memory for storing content and a network module; and a terminal device configured to receive the content through the network module and transmits the received content to a purchaser device when the external memory and the network module are connected according to a manipulation of the toggle switch.

The content wallet may transmit a first password input through an input module to the terminal device, and the terminal device may receive the content from the content wallet when a second password input by the user corresponds to the first password.

The terminal device may store a distributed ledger including contribution information of contributors related to a generation of the content, distribute an amount according to a transaction of the content according to the contribution information, and transmit the distributed amount to accounts of the contributors.

The terminal device may store a distributed ledger including contribution information of contributors related to a generation of the content, distribute electronic money corresponding to an amount of a transaction of the content according to the contribution information, and transmit the distributed electronic money to the contributors.

The distributed ledger may include block chain data, and each block may include the contribution information of the contributor.

According to still another aspect of the disclosure, a terminal device includes at least one processor; and a memory configured to be electrically connected to the processor, wherein the memory stores instructions that, when executed by the processor, cause content to be received from content wallet, when a network module of the content wallet and an external memory for storing the content are connected according to a manipulation of a toggle switch, and cause the received content to be transmitted to a purchaser device.

Advantageous Effects

The content wallet, the terminal device, and the content sales system including the same according to the technical idea of the disclosure may provide fair compensation for content transactions to the content creators and the contributors who have contributed to content production.

Further, according to the disclosure, it is possible to prevent unauthorized distribution of content due to hacking or the like.

Further, according to the disclosure, it is possible to promote an activation of content transactions between individuals.

The effects of the disclosure are not limited to the effects mentioned above, and other effects that are not mentioned may be obviously understood by those skilled in the art to which the disclosure pertains from the following description.

DESCRIPTION OF DRAWINGS

In order to more fully understand the drawings cited in the disclosure, a brief description of each drawing is provided.

FIG. 1 is a diagram illustrating a content sales system according to diverse embodiments of the disclosure.

FIG. 3 is a block diagram illustrating a configuration of a terminal device according to diverse embodiments of the disclosure.

FIG. 4 is a flowchart illustrating a content sales method according to diverse embodiments of the disclosure.

FIG. 5 is a conceptual diagram illustrating a distributed ledger according to diverse embodiments of the disclosure.

BEST MODE

Figure 2A:
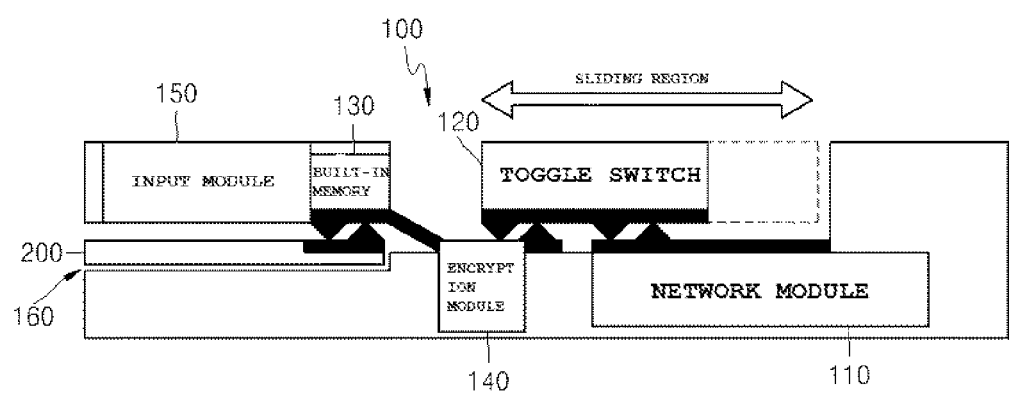
FIGS. 2A and 2B are side views illustrating of a content wallet according to diverse embodiments of the disclosure.

The technical spirit of the disclosure may apply various modifications and have various embodiments, and specific embodiments will be illustrated in the drawings and described in detail in the detail description. However, this is not intended to limit the technical spirit of the disclosure to a specific embodiment, it is to be understood to include all modifications, equivalents, and substitutes included in the technical spirit of the disclosure.

In describing the technical idea of the disclosure, when it is determined that the detailed description of the related known technology may unnecessarily obscure the spirit of the disclosure, the detailed description thereof will be omitted. In addition, numbers (e.g., first, second, etc.) used in the description process of the disclosure are only identifiers for distinguishing one component from other components.

Further, in the disclosure, when one component is referred to as "connected" or "coupled" to another component, it is to be understood that one component may be directly connected or directly coupled to another component, but may be connected or connected through another component in the middle, unless specifically stated to the contrary.

In addition, terms such as "~ unit", "~ or", "~ er", "~ module", etc. described in the disclosure mean a unit that processes at least one function or operation, and may be implemented by hardware or software or a combination of hardware and software, such as a processor, a micro processor, an application processor, a micro controller, a central processing unit (CPU), a graphics processing unit (GPU), an accelerate processor unit (APU), a digital signal processor (DSP), an application specific integrated circuit (ASIC), a field programmable gate array (FPGA), and the like.

In addition, it is intended to clarify that the classification of the components in the disclosure is merely a division for each main function that each component is responsible for. That is, two or more components to be described below may be combined into one component, or one component may be divided into two or more components for each more subdivided function. In addition, each of the components to be described below may also additionally perform some or all of the functions of the other components in addition to the main function it is responsible for, and some of the main functions that each of the components is responsible for may be exclusively performed by other components.

Hereinafter, embodiments according to the technical spirit of the disclosure will be described in detail in turn.

Figure 2B:
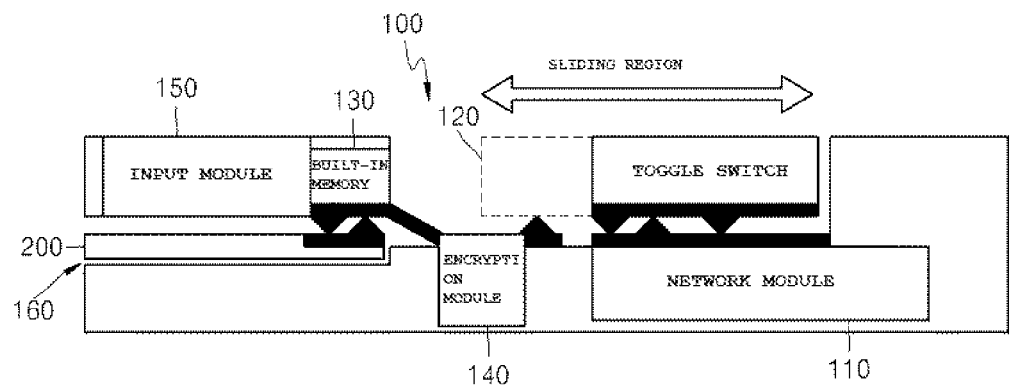

FIG. 1 is a diagram illustrating a content sales system according to diverse embodiments of the disclosure, and FIGS. 2A and 2B are side views illustrating of a content wallet 100 according to diverse embodiments of the disclosure.

A content sales system according to an embodiment includes a content wallet 100 and a terminal device 300. The content wallet 100 and the terminal device 300 may be communicatively connected to and communicate with each other through network modules 110 and 310. The network module 110 of the content wallet 100 and the network module 310 of the terminal device 300 may be connected to each other through a network. Here, the network may include a wired network and/or a wireless network. Specifically, the network may include various networks such as a local area network (LAN), a metropolitan area network (MAN), and a wide area network (WAN). However, the network according to the disclosure is not limited to the above-listed networks, and may include at least a part of a well-known wireless data network, a well-known telephone network, and a well-known wired/wireless television network.

In an embodiment, the content wallet 100 may be detachably mounted on the terminal device 300 or separated from the terminal device 300.

Referring to FIGS. 1 and 2, the content wallet 100 may include a network module 110, a toggle switch 120, a built-in memory 130, an encryption module 140, and an input module 150. The network module 110 and the encryption module 140 may be implemented with at least one processor, and the built-in memory 130 may be a storage medium including one or more non-volatile memory elements such as RAM, ROM, EPROM, EEPROM, and hard disk.

The external memory 200 stores content. The content stored in the external memory 200 may be a transaction target. In an embodiment, the content may include an image, a movie, a drama, a document, or music, but the type of contents is not limited thereto. Various types of contents that may be transmitted to another terminal through a communication network may be stored in the external memory 200.

In a state in which the external memory 200 is inserted into an accommodating groove 160, the external memory 200 and the network module 110 may be connected according to a manipulation of a user for the toggle switch 120. For example, as illustrated in FIG. 2A, when the toggle switch 120 is slid in a first direction, for example, in a direction in which the external memory 200 is located, the external memory 200 and the network module 110 may be connected to each other. In addition, as illustrated in FIG. 2B, when the toggle switch 120 is slid in a second direction, for example, in a direction opposite to the first direction, the connection between the external memory 200 and the network module 110 may be released.

FIG. 2A illustrates that the external memory 200 and the network module 110 are connected to each other through a connection terminal of the built-in memory 130, a connection terminal of the encryption module 140, and a connection terminal of the toggle switch 120, but this is only an example, and the external memory 200 and the network module 110 may be connected to each other in various ways according to an arrangement structure of the built-in memory 130, the encryption module 140, the toggle switch 120, and the network module 110. In an example, as the connection terminal of the external memory 200 contacts the connection terminal of the toggle switch 120 and the connection terminal of the toggle switch 120 contacts the connection terminal of the network module 110, the external memory 200 and the network module 110 may be connected to each other.

In addition, the toggle switch 120 may operate in a sliding manner as illustrated in FIGS. 2A and 2B. According to an implementation example, the toggle switch 120 may operate in various manners, such as a manner that it is flipped forward and backward.

When the external memory 200 is connected to the network module 110 according to the manipulation of the toggle switch 120, the content stored in the external memory 200 is transmitted to the terminal device 300 through the network module 110. The content transmitted to the terminal device 300 may be transmitted from the terminal device 300 to a purchaser terminal according to a request of the purchaser terminal.

In an embodiment, the encryption module 140 may encrypt the content in an analog manner using a pre-stored mechanism. In this case, the content encrypted by a physical medium may be transmitted to the terminal device 300 through the network module 110.

In another embodiment, the encryption module 140 may encrypt content in a digital manner using a pre-stored logical algorithm. In this case, the encrypted content may be transmitted to the terminal device 300 through the network module 110. As an example, the content may be encrypted according to a public key encryption method or a private key encryption method. When the content encrypted as described above is transmitted from the terminal device 300 to the purchaser terminal, a decryption key capable of decrypting the encrypted content may also be transmitted to the purchaser terminal. Then, the purchaser terminal may use the content after decrypting the encrypted content with the decryption key.

The input module 150 may be provided for user authentication. The input module 150 may receive a first password from the user. The first password may be transmitted to the terminal device 300 through the network module 110. The input module 150 may include a plurality of number (or letter) buttons, and in this case, the first password may include a predetermined number of numbers (or letters). As another example, the input module 150 may include a single button, and in this case, the first password may include the number of selections or pushes of the single button.

The input module 150 may be implemented as a button, but may also be implemented as a number (or letter) dial or a biometric sensor, depending on the implementation example. Here, the biometric sensor may include a fingerprint sensor, an iris sensor, a face sensor, and the like.

When the first password is transmitted to the terminal device 300 and a second password is input from the user through an input means (e.g., a touch screen, a keyboard, a mouse, a voice input, etc.) of the terminal device 300, the terminal device 300 determines whether the second password corresponds to the first password. For example, the terminal device 300 may determine whether the second password is the same as the first password. When the second password corresponds to the first password, the terminal device 300 may complete the user authentication and receive the content from the content wallet 100. Conversely, when the second password does not correspond to the first password, the terminal device 300 does not receive the content from the content wallet 100 and may output a message indicating that the user authentication has failed through a display or a speaker.

As another embodiment for user authentication, the input module 150 may not be included in the content wallet 100, and instead, the first password may be pre-stored in the built-in memory 130. When the external memory 200 is connected to the network module 110 according to the manipulation of the toggle switch 120, the first password stored in the built-in memory 130 may be transmitted to the terminal device 300 through the network module 110. When the second password is input from the user through an input means (e.g., a touch screen, a keyboard, a mouse, a voice input, etc.) of the terminal device 300, the terminal device 300 determines whether the second password corresponds to the first password. For example, the terminal device 300 may determine whether the second password is the same as the first password. When the second password corresponds to the first password, the terminal device 300 may complete the user authentication and receive the content from the content wallet 100. Conversely, when the second password does not correspond to the first password, the terminal device 300 does not receive the content from the content wallet 100 and may output a message indicating that the user authentication has failed through a display or a speaker.

As still another embodiment for user authentication, when the second password is input from the user through the input means of the terminal device 300, the terminal device 300 transmits the second password to the network module 110 of the content wallet 100. In addition, when the external memory 200 is connected to the network module 110 according to the manipulation of the toggle switch 120, the first password pre-stored in the built-in memory 130 or the first password input from the user through the input module 150 may be transmitted to the network module 110. The network module 110 determines whether the second password corresponds to the first password. For example, the network module 110 may determine whether the second password is the same as the first password. When the second password corresponds to the first password, the network module 110 may complete the user authentication and transmit the content to the terminal device 300. Conversely, when the second password does not correspond to the first password, the network module 110 may not transmit the content to the terminal device 300.

FIG. 3 is a block diagram illustrating a configuration of a terminal device 300 according to diverse embodiments of the disclosure.

Referring to FIG. 3, a terminal device 300 may include a processor 330 and a memory 350. The network module 310 described above may be implemented as the processor 330.

The processor 330 may include at least one processor. The processor 330 may transmit the content received from the content wallet 100 to the purchaser terminal. The processor 330 may check whether fee payment for content transaction is completed by the purchaser, and transmit the content to the purchaser terminal when the fee payment completion is checked. In addition, the processor 330 may disclose meta information (e.g., title, price, plot, etc.) of the content received from the content wallet 100 to other terminals through a network for content sale. Other terminals may access the terminal device 300 through the network to check the meta information of the content being sold by the terminal device 300.

The memory 350 may store various data related to the above-described content sales operation. The memory 350 may include a storage.

The terminal device 300 may include various types of devices capable of being connected to the content wallet 100 and capable of being network-accessed, for example, such as a desktop PC, a tablet PC, a notebook computer, a smartphone, and a wearable device.

FIG. 4 is a flowchart illustrating a content sales method according to diverse embodiments of the disclosure.

In step S410, the terminal device 300 receives content from the content wallet 100. The terminal device 300 may receive encrypted content from the content wallet 100.

As described above, when the external memory 200 is connected to the network module 110 according to the manipulation of the toggle switch 120 in the state in which the external memory 200 is inserted into the content wallet 100, the content stored in the external memory 200 may be transmitted to the terminal device 300.

When the user authentication is completed, the terminal device 300 may receive the content from the content wallet 100.

In step S420, the terminal device 300 receives a purchase request for content from the purchaser terminal. In an embodiment, the terminal device 300 may disclose the meta information of the content received from the content wallet 100 to other terminals through the network, and may receive a purchase request for content from a purchaser terminal checking the disclosed meta information.

In step S430, the terminal device 300 transmits the content to the purchaser terminal according to the purchase request of the purchaser terminal. The terminal device 300 may transmit the content to the purchaser terminal when the fee payment completion of the content is checked. In an embodiment, the terminal device 300 may transmit a decryption key for decrypting the encrypted content to the purchaser terminal.

In step S440, the terminal device 300 may distribute a transaction amount according to contribution information of contributors who have contributed to the production of the content and transmit the distributed transaction amount to the accounts of the contributors. The contributors refer to people who have contributed to the production of the content, and may include, for example, screenwriters, cinematographers, and directors of content. When the content is a secondary work, the contributor may include a secondary copyright holder.

Meanwhile, according to an implementation example, the terminal device 300 may distribute electronic money corresponding to the transaction amount according to the contribution information of the contributors who contributed to the production of the content and distribute the distributed electronic money to the contributors. Here, the electronic money is an electronic payment means that replaces cash, and may be a concept encompassing cryptocurrency, cyber money, and the like.

In an embodiment, the terminal device 300 may store a distributed ledger including the contribution information of contributors for accurate distribution of the transaction amounts and the electronic money. The distributed ledger may also be stored in terminals of contributors.

FIG. 5 is a conceptual diagram illustrating a distributed ledger according to diverse embodiments of the disclosure.

As illustrated in FIG. 5, a distributed ledger includes block chain data 500. The block chain data 500 may include a plurality of blocks 510, 520, 530, 540, and 550 connected to each other, and each block may include contribution information of a contributor. For example, block 1 510 may include contribution information of a contributor 1, and block 2 520 may include contribution information of a contributor 2. Meanwhile, each block may further include an address value, a parameter, and the like related to the contribution.

When a block including contribution information of a contributor who has contributed to content production is newly generated, the newly generated block may be added to the block chain data 500 upon approval of existing contributor terminals. For example, when the content is a secondary work, a block including contribution information of a secondary copyright holder may be newly generated, and upon approval of original copyright holders, the block including the contribution information of the secondary copyright holder may be included in the block chain data 500.

The terminal device 300 may store a distributed ledger for each content to be sold. For example, the terminal device 300 may store a distributed ledger A for content A and a distributed ledger B for content B. When the sale of content A is completed, the transaction amount may be distributed according to the distributed ledger A and provided to contributors of content A, and when the sale of the B content is completed, the transaction amount may be distributed according to the distributed ledger B and provided to contributors of content B.

Figure 6:
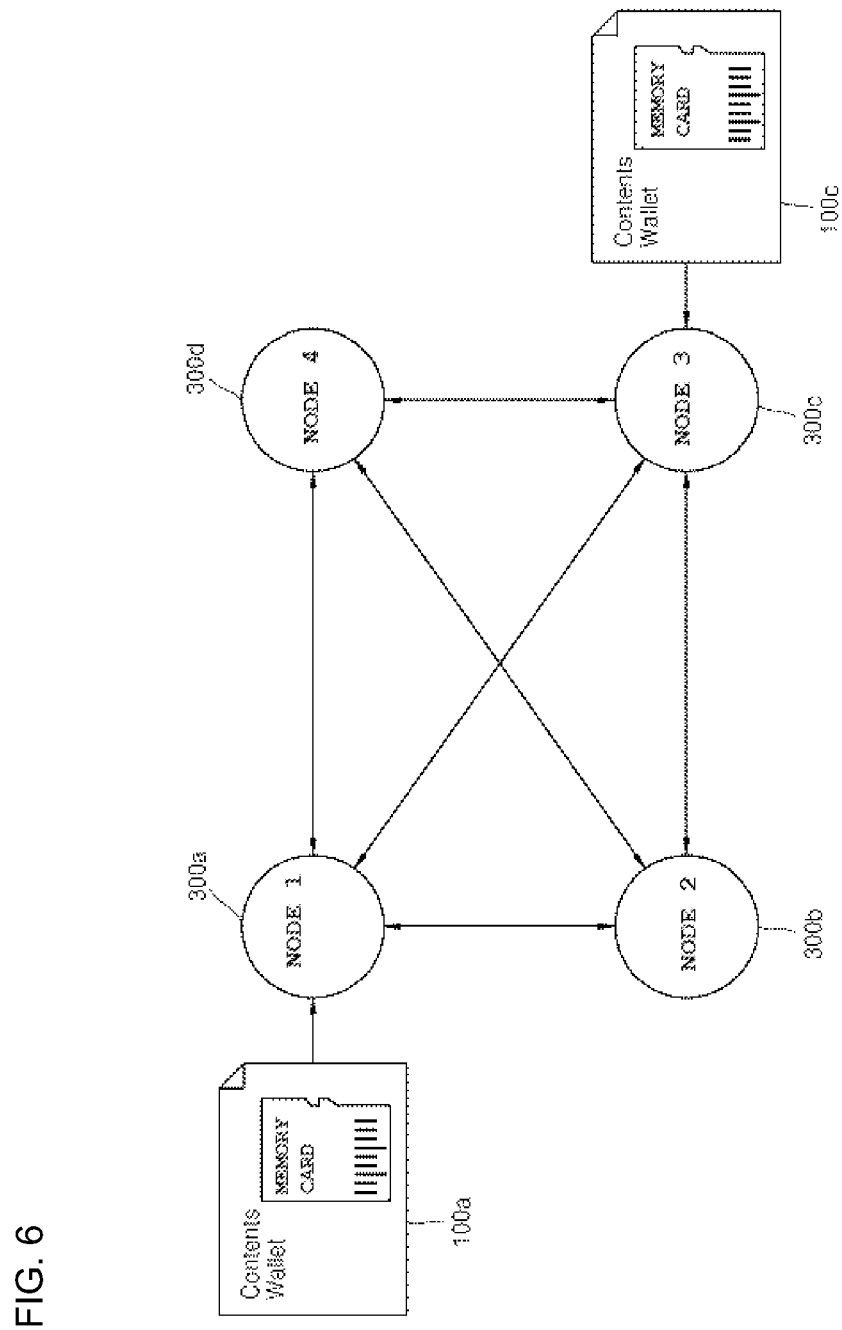
FIG. 6 is an exemplary diagram illustrating a network structure for content transaction according to diverse embodiments of the disclosure.

FIG. 6 is an exemplary diagram illustrating a network structure for content transaction according to diverse embodiments of the disclosure.

Among the nodes illustrated in FIG. 6, a node 1 300*a* and a node 3 300*c* may correspond to the terminal device 300 described above, and a node 2 300*b* and a node 4 300*d* may correspond to the purchaser terminal. Because users of the node 1 300*a* and the node 3 300*c* may also purchase content, the node 1 300*a* and the node 3 300*c* may also correspond to the purchaser terminal. When the content wallet 100 is connected to the node 2 300*b* and the node 4 300*d*, the node 300*b* and the node 4 300*d* may also correspond to the terminal device 300 described above.

The user of node 1 300*a* inserts the external memory 200 into a content wallet 100*a* and manipulates the toggle switch 120, thereby making it possible to sell the content stored in the external memory 200 to users of other nodes. When the content stored in the external memory 200 is transmitted to the node 1 300*a*, the node 1 300*a* may disclose the meta information of the content to the nodes 2 300*b*, the node 3 300*c*, and the node 4 300*d*. When the node 2 300*b* makes a purchase request for the content to the node 1 300*a*, the node 1 300*a* may check whether the payment by the node 2 300*b* is completed, and may transmit the content to the node 2 300*b* when the payment is completed. The node 2 300*b* may reproduce the received content.

Although not illustrated in FIG. 6, the node 1 300*a*, the node 2 300*b*, the node 3 300*c*, and the node 4 300*d* may communicate with each other via a network. Here, the network may include a wireless network.

According to an embodiment of the disclosure, only when the user inserts the external memory 200 into the content wallet 100 and physically connects the external memory 200 and the network module 110 through the manipulation of the toggle switch 120, the content stored in the external memory 200 may be sold. That is, because the network connection of the external memory 200 is controlled through an active action of the user, it is possible to prevent the content stored in the external memory 200 from being leaked through hacking or the like.

In addition, the user may simply control the interruption and resumption of content sales by simply manipulating the toggle switch 120.

Hereinabove, the technical spirit of the disclosure has been described in detail with reference to various embodiments, but is not limited to the above embodiments, and various modifications and changes are possible by those skilled in the art within the scope of the technical spirit of the disclosure.

The invention claimed is:

1. A content wallet comprising:
a network module executable by a processor, the network module configured to communicate with a terminal device, the network module having an acc;
an input module comprising a button, a number dial, a letter dial, a biometric sensor, a touch screen, a keyboard, a mouse, or a voice input, the input module configured to receive a password for user authentication;
a built-in memory;
an external memory inserted into an accommodation groove and being in electrically contact with the built-in memory;
a toggle switch configured to control a connection between the external memory and the network module, the toggle switch being in electrically contact with the network module;
an encryption module executable by the processor, the encryption module electrically connected to the built-in memory and spaced apart from the network module, the encryption module configured to encrypt a content stored in the external memory using a physical medium; and
wherein connection between the external memory and the network module is controlled according to the user's manipulation of the toggle switch,
wherein, when the toggle switch is moved in a first direction according to the manipulation of the user, the toggle switch is configured to be in electrically contact with both the encryption module which is in electrically connected to the built-in memory being in electrically contact with the external memory and the network module which is electrically connected to the toggle switch so that the external memory and the network module are connected through the encryption module, the built-in memory and the toggle switch, and a content stored in the external memory is transmitted to the terminal device through the network module to sell the content, and
when the toggle switch is moved in a second direction opposite to the first direction according to the manipulation of the user, the toggle switch is configured to be not in electrically contact with the encryption module which is in electrically connected to the built-in memory being in electrically contact with the external memory, but is still in contact with the network module so that the connection between the external memory and the network module is released, and the content transmission to the terminal device is stopped, thereby performing a function of stopping the sale of the content, and when a first password input from the user through the input module is transmitted to the terminal device and a second password input from the user through the terminal device corresponds to the first password, the contents stored in the external memory are transmitted to the terminal device through the network module.

2. A content wallet comprising:
a network module executable by a processor, the network module configured to communicate with a terminal device;
an input module comprising a button, a number dial, a letter dial, a biometric sensor, a touch screen, a keyboard, a mouse, or a voice input, the input module configured to receive a password for user authentication;
a built-in memory;
an external memory inserted into an accommodation groove and being in electrically contact with the built-in memory:
an encryption module executable by the processor, he encryption module electrically connected to the built-in memory and spaced apart from the network module, the encryption module configured to encrypt a content stored in an external memory using a physical medium; and
a toggle switch configured to control a connection between the external memory inserted into an accommodation groove and the network module,
wherein connection between the external memory and the network module is controlled according to the user's manipulation of the toggle switch,
wherein when the toggle switch is moved in a first direction according to the manipulation of the user, the toggle switch is configured to be in electrically contact with both the encryption module which is in electrically connected to the built-in memory being in electrically contact with the external memory and the network module which is electrically connected to the toggle switch so that the external memory and the network module are connected through the encryption module, the built-in memory and the toggle switch, and the content stored in the external memory is transmitted to the terminal device through the network module to sell the content and
when the toggle switch is moved in a second direction opposite to the first direction according to the manipulation of the user, the toggle switch is configured to be not in electrically contact with the encryption module which is in electrically connected to the built-in memory being in electrically contact with the external memory, but is still in contact with the network module so that the connection between the external memory and the network module is released, and the content transmission to the terminal device is stopped, thereby performing a function of stopping the sale of the content, and
wherein the content stored in the external memory is encrypted by the encryption module using the physical medium, and the encrypted content is transmitted to the terminal device through the network module, when the external memory and the network module are connected according to a manipulation of a user for the toggle switch.

3. A content sales system comprising:
the content wallet according to claim 1; and
a terminal device executable by the processor configured to receive the content through the network module and transmits the received content to a purchaser device when the external memory and the network module are connected according to a manipulation of the toggle switch.

4. The content sales system as claimed in claim 3, wherein the terminal device stores a distributed ledger including contribution information of contributors related to a generation of the content, distributes an amount according to a transaction of the content according to the contribution information, and transmits the distributed amount to accounts of the contributors.

5. The content sales system as claimed in claim 3, wherein the terminal device stores a distributed ledger including contribution information of contributors related to a generation of the content, distributes electronic money corresponding to an amount of a transaction of the content according to the contribution information, and transmits the distributed electronic money to the contributors.

6. The content sales system as claimed in claim 4, wherein the distributed ledger includes block chain data, and
each block includes the contribution information of the contributor.

7. The content sales system as claimed in claim 5, wherein the distributed ledger includes block chain data, and
each block includes the contribution information of the contributor.

* * * * *